United States Patent
Merzhaeuser et al.

(10) Patent No.: US 9,822,761 B2
(45) Date of Patent: Nov. 21, 2017

(54) STRUCTURAL COMPONENTS AND METHODS OF MANUFACTURING

(71) Applicant: General Electric Company, Schenectady, NY (US)

(72) Inventors: Thomas Merzhaeuser, München (DE); Andreas Herrig, Garching b.Müchen (DE)

(73) Assignee: General Electric Company, Niskayuna, NY (US)

( * ) Notice: Subject to any disclaimer, the term of this patent is extended or adjusted under 35 U.S.C. 154(b) by 464 days.

(21) Appl. No.: 14/458,554

(22) Filed: Aug. 13, 2014

(65) Prior Publication Data
US 2016/0047252 A1    Feb. 18, 2016

(51) Int. Cl.
| F03D 1/06 | (2006.01) |
| B29C 70/00 | (2006.01) |
| B29D 99/00 | (2010.01) |
| B29C 70/02 | (2006.01) |
| B29C 70/52 | (2006.01) |
| B29L 31/08 | (2006.01) |

(52) U.S. Cl.
CPC ............ F03D 1/0675 (2013.01); B29C 70/00 (2013.01); B29C 70/023 (2013.01); B29D 99/0028 (2013.01); B29C 70/52 (2013.01); B29L 2031/085 (2013.01); F05B 2230/60 (2013.01); F05B 2280/6003 (2013.01); Y02E 10/721 (2013.01); Y02P 70/523 (2015.11)

(58) Field of Classification Search
CPC ....... B29C 70/00; B29C 70/023; B29C 70/52; B29L 2031/085; B29D 99/0028; F03D 1/0675
See application file for complete search history.

(56) References Cited

U.S. PATENT DOCUMENTS

| 6,364,021 B1* | 4/2002 | Coats ................... E21B 17/003 166/350 |
| 7,758,313 B2* | 7/2010 | Eyb ........................ F03D 1/065 416/226 |
| 8,114,329 B2 | 2/2012 | Karem |

(Continued)

FOREIGN PATENT DOCUMENTS

| EP | 2899396 A1 | 7/2015 |
| WO | 2009095175 A2 | 8/2009 |

(Continued)

OTHER PUBLICATIONS

Danish Search Report and Written Opinion issued in connection with corresponding DK Application No. PA 201570523 dated Jun. 10, 2016.

(Continued)

*Primary Examiner* — Woody Lee, Jr.
(74) *Attorney, Agent, or Firm* — Nitin N. Joshi

(57) ABSTRACT

A method of manufacturing is presented. The method includes providing a plurality of structural layers comprising a plurality of composite rods, wherein at least one structural layer from the plurality of structural layers is attached to a separation layer. The method further includes stacking the plurality of structural layers, detaching the separation layer from the at least one structural layer, and curing the plurality of structural layers to form a structural component of a wind turbine blade.

18 Claims, 7 Drawing Sheets

(56) References Cited

U.S. PATENT DOCUMENTS

| | | | |
|---|---|---|---|
| 8,262,361 | B2 | 9/2012 | Sanz Pascual et al. |
| 8,360,733 | B2 | 1/2013 | Bell et al. |
| 8,382,440 | B2 | 2/2013 | Baker et al. |
| 8,475,133 | B2 | 7/2013 | Baker et al. |
| 8,480,370 | B2 | 7/2013 | Baker et al. |
| 8,500,408 | B2 | 8/2013 | Baker et al. |
| 8,500,409 | B2 | 8/2013 | Baker et al. |
| 8,506,258 | B2 | 8/2013 | Baker et al. |
| 8,529,717 | B2 | 9/2013 | Hedges et al. |
| 8,540,491 | B2 * | 9/2013 | Gruhn .................... B29B 11/16 416/230 |
| 2010/0035016 | A1 * | 2/2010 | Ahrens .................. B29C 70/44 428/113 |
| 2010/0068065 | A1 | 3/2010 | Jensen |
| 2010/0263898 | A1 * | 10/2010 | Hebert ..................... B64C 1/12 174/2 |
| 2010/0310380 | A1 * | 12/2010 | Bech ..................... B29C 70/382 416/230 |
| 2011/0036482 | A1 * | 2/2011 | Stenbaek ................ B29C 73/10 156/98 |
| 2011/0116935 | A1 * | 5/2011 | Wansink ............... B29C 69/004 416/229 R |
| 2011/0135485 | A1 | 6/2011 | Wang |
| 2012/0027609 | A1 * | 2/2012 | Ogde .................... B29C 70/86 416/226 |
| 2012/0076647 | A1 * | 3/2012 | Robertson, Jr. ....... F01D 21/045 415/182.1 |
| 2013/0136890 | A1 | 5/2013 | Maliszewski et al. |
| 2013/0333823 | A1 | 12/2013 | Hedges et al. |

FOREIGN PATENT DOCUMENTS

| | | |
|---|---|---|
| WO | 2012161741 A2 | 11/2012 |
| WO | 2013087078 A1 | 6/2013 |
| WO | 2014045429 A1 | 3/2014 |
| WO | 2014079456 A1 | 5/2014 |

OTHER PUBLICATIONS

Kaverman, "Reinforced Plastics and Composites", SPI Plastics Engineering Handbook of the Society of the Plastics Industry, Inc., Springer Link, 1991, pp. 511-540.

Novo et al., "Development of a new pultrusion equipment to manufacture thermoplastic matrix composite profiles", European Society for Composite Materials, Repositorium, Venice, Italy, Jun. 24, 2012, 8 Pages.

Gruhn et al., "RodPack: A New Form of Aligned Fiber Reinforcement for Wind Blade Spar Caps", 2012 Wind Turbine Blade Workshop Sandia National Laboratories, NEPTCO Incorporated, Downloaded from the Internet:<http://energy.sandia.gov/wp/wp-content/gallery/uploads/2A-B-2-Gruhn1.pdf> on Aug. 5, 2014; 2012, 26 Pages.

Marske, J., "Graphlite Carbon Rod," Retrieved from the Internet URL: https://web.archive.org/web/20120614110806/http://www.continuo.com/marske/ARTICLES/Carbon%20rods/carbon.htm, on Jun. 14 2012, pp. 7.

* cited by examiner

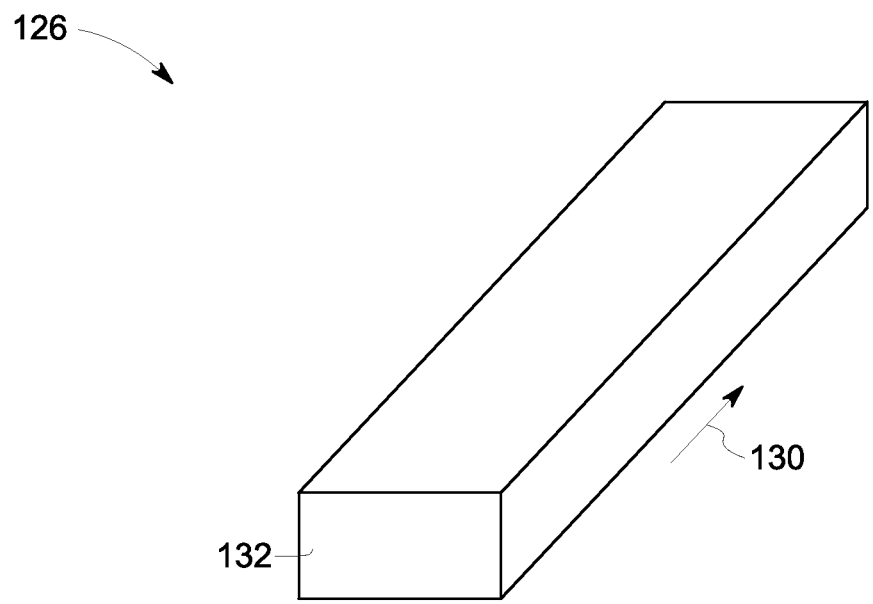
FIG. 5
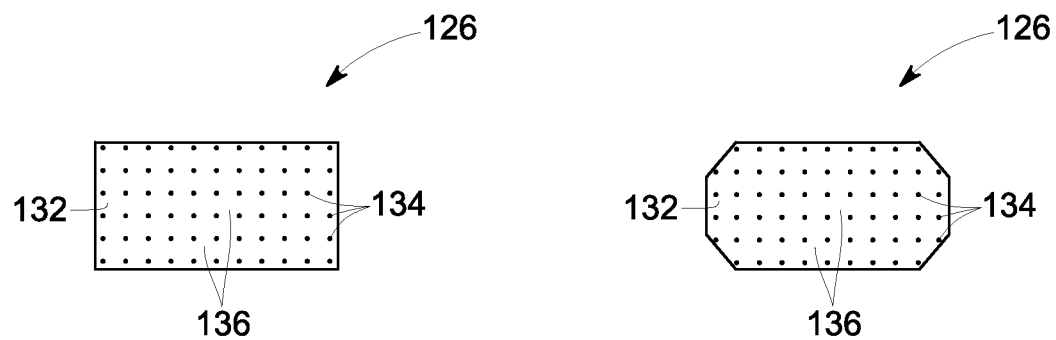
FIG. 6
FIG. 7

STRUCTURAL COMPONENTS AND METHODS OF MANUFACTURING

BACKGROUND OF THE INVENTION

The present invention relates to methods of manufacturing wind turbine blade spar caps and other structural components and to the manufactured components.

A wind turbine blade has a cross-sectional profile of an airfoil such that, during operation, air flows over the blade producing a pressure difference between a pressure side and a suction side of the blade. Consequently, a lift force, which is directed from the pressure side towards the suction side, acts on the blade. The lift force generates torque on a main rotor shaft, which is supplied to a generator for producing electricity.

A wind turbine blade typically includes a suction side and a pressure side. An internal shear web typically extends between the pressure and suction sides and is bonded to spar caps affixed to inner faces of the pressure and suction sides.

The spar cap is often made of composite material and can be manufactured using pre-impregnated composite fibers (otherwise known as pre-preg). The pre-preg material is stored in the form of tapes which are laid down in layers to provide the thickness of the spar cap. The layered material is then cured. However, during the formation of multiple layers from the pre-preg tapes, imperfections such as kinks and wrinkles may become incorporated and later compromise the structural integrity of the spar cap. Additionally, the rate of laydown of pre-preg tapes is often slow, as faster laydown speeds lead to shearing of the previous layer and inclusion of air bubbles, and thus may compromise the structural integrity of the spar cap.

An alternative technique of manufacturing a spar cap is by using laminates from dry unidirectional fabrics. However, perfectly straight fiber alignment is difficult to achieve using this technique, resulting in reduction of compressive strength of the spar cap. Additionally, a slow pace of manufacturing is required for this technique, as faster speeds may lead to shearing of previous layers, which may compromise the structural integrity of the spar cap.

Although spar caps are described herein for purposes of illustration, similar challenges occur in pre-peg manufacturing processes used for other structural components such as subsea risers and gas turbine platforms, for example.

Accordingly, it would be desirable to have an improved method of forming composite spar caps or other such composite structural components.

BRIEF DESCRIPTION OF THE INVENTION

One embodiment of the invention is directed towards a method of manufacturing. The method includes providing a plurality of structural layers comprising a plurality of composite rods, wherein at least one structural layer from the plurality of structural layers is attached to a separation layer. The method further includes stacking the plurality of structural layers, detaching the separation layer from the at least one structural layer, and curing the plurality of structural layers to form a structural component of a wind turbine blade.

Another embodiment of the invention is directed towards a method of manufacturing. The method includes providing a plurality of structural layers and a plurality of separation layers, wherein each structural layer among the plurality of structural layers comprises a plurality of at least partially wetted composite rods and is attached to a respective separation layer among the plurality of separation layers. The method further includes stacking the plurality of structural layers and the plurality of separation layers, detaching the plurality of separation layers from the respective structural layers, and curing the plurality of structural layers to form a structural component.

A further embodiment of the invention is directed towards a spar cap for a wind turbine blade. The spar cap includes a first structural layer comprising a first set of composite rods, a second structural layer comprising a second set of composite rods, a third structural layer comprising a third set of composite rods, and a matrix bonding the plurality of composite rods in the first, second and third structural layers. The third set of composite rods comprises lengths that are longer than lengths of the first set of composite rods, the second set of composite rods have lengths at least equal to the lengths of the first set of composite rods and not exceeding the lengths of the third set of composite rods, and at least one composite rod from the second set of composite rods is longer than some other composite rods among the second set of composite rods.

DRAWINGS

These and other features and aspects of the present invention will become better understood when the following detailed description is read with reference to the accompanying drawings in which like characters represent like parts throughout the drawings.

FIG. 5 is a perspective view of a composite rod in accordance with an embodiment of the present invention.

FIG. 6 is the cross-sectional view of a composite rod in accordance with an embodiment of the present invention.

FIG. 7 shows a cross-sectional view of a composite rod in accordance with another embodiment of the present invention.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. Approximating language, as used herein throughout the specification and claims, may be applied to modify any quantitative representation that could permissibly vary, without resulting in a change in the basic function to which it is related. Accordingly, a value modified by a term or terms, such as "about," is not limited to the precise value specified. In some instances, the approximating language may correspond to the precision of an instrument for measuring the value. Furthermore, the method embodiments are not limited by a particular sequence of steps, unless the context clearly indicates otherwise.

Figure 1:
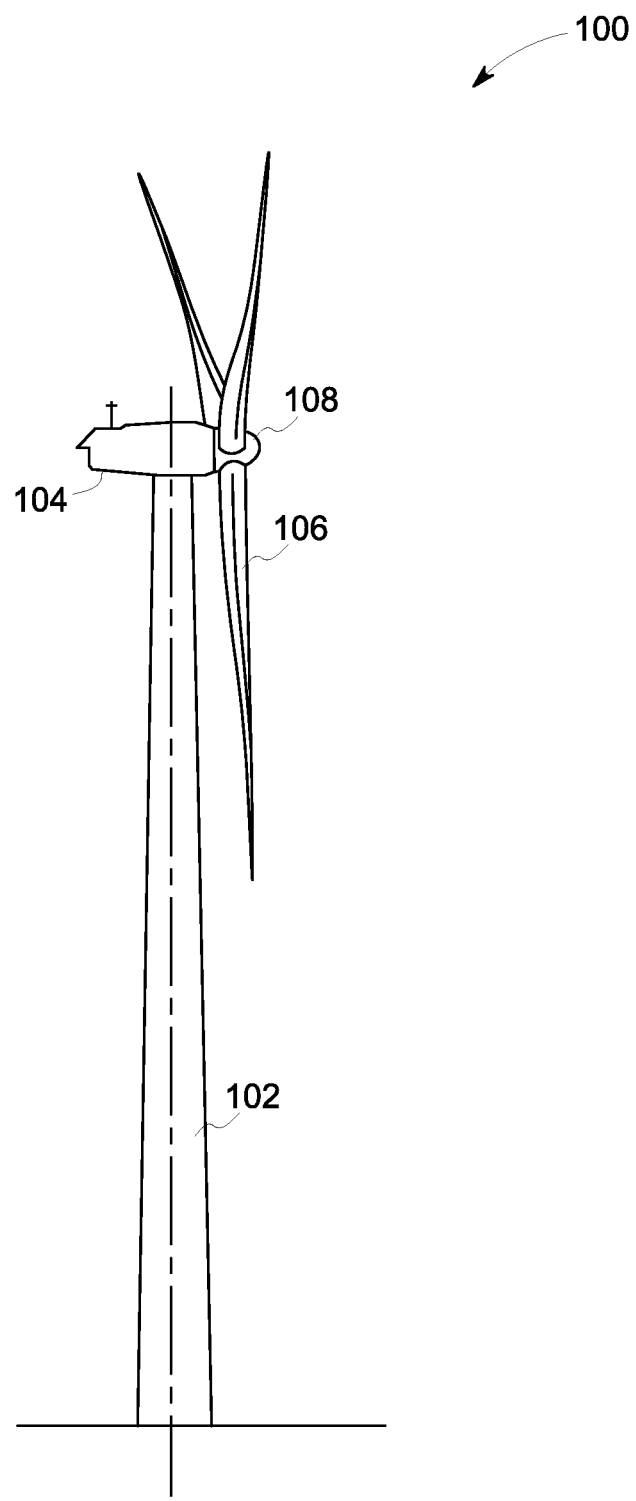
FIG. 1 is a perspective view of a conventional wind turbine.
Figure 2:
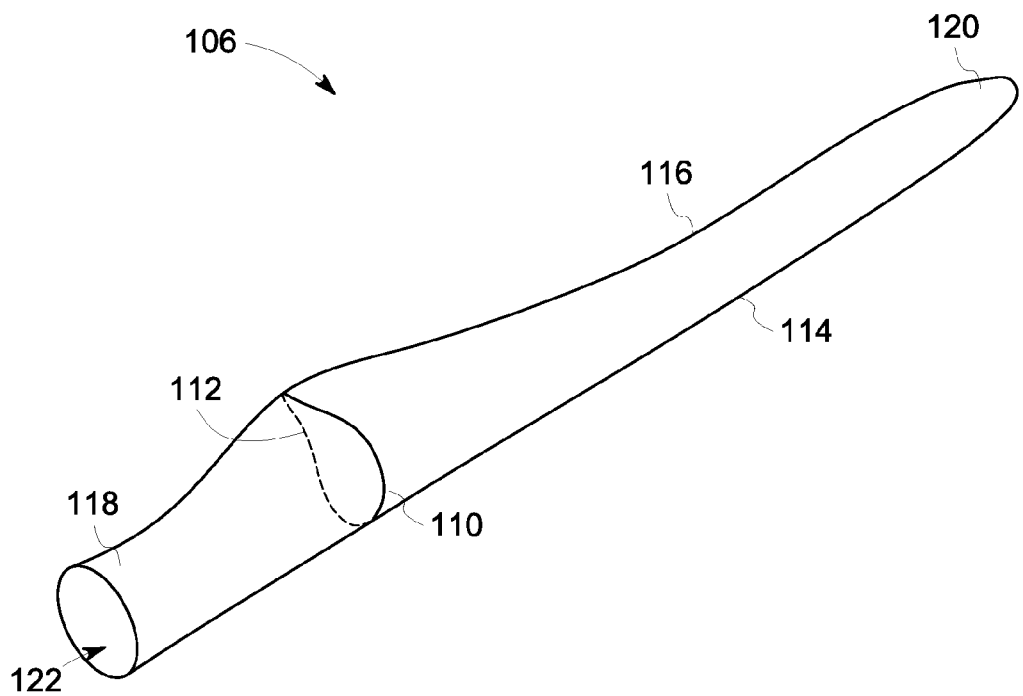
FIG. 2 is a perspective view of a conventional wind turbine blade.
Figure 3:
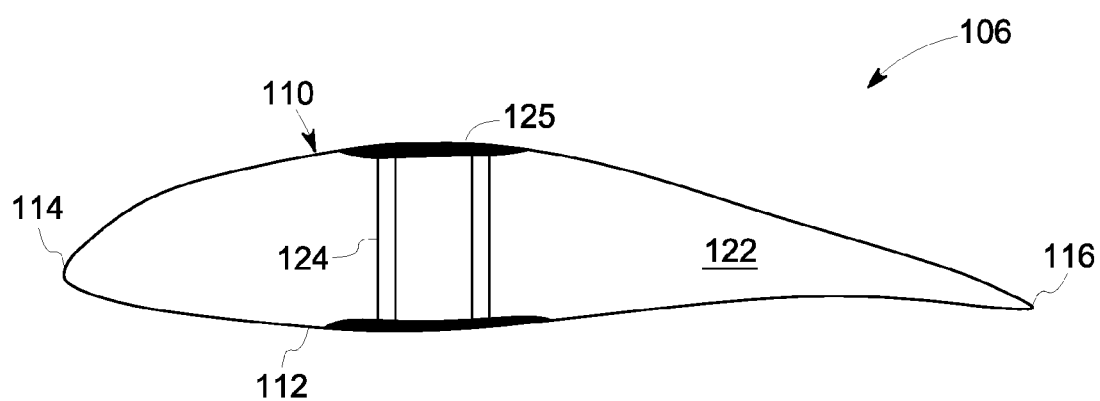
FIG. 3 is a cross-sectional view of a conventional wind turbine blade.

FIGS. 1-3 are provided for illustrative purposes to place the present invention in an exemplary field of use. The invention is not limited to any particular structure or any particular type of wind turbine configuration.

FIG. 1 illustrates a wind turbine 100 of conventional construction. The wind turbine 100 includes a tower 102 with a nacelle 104 mounted thereon. A plurality of turbine blades 106 are mounted to a rotor hub 108, which is in turn connected to a main flange (not shown) that turns a main rotor shaft (not shown). The wind turbine power generation and control components (not shown) are housed within the nacelle 104.

FIG. 2 is a detailed view of a wind turbine blade 106, and FIG. 3 is a cross-sectional view of the same wind turbine blade 106. In an exemplary embodiment, the blade 106 includes a pressure side shell member 110 and a suction side shell member 112. The blade 106 includes a leading edge 114 and a trailing edge 116, as well as a root portion 118 and a tip portion 120. The pressure and suction side shell members may be joined together at the leading edge 114 and the trailing edge 116. The blade 106 includes an internal cavity 122 in which various structural members, such as spar caps and one or more shear webs, are configured. A longitudinal length of the blade 106 is the distance between the root portion 118 and the tip portion 120. The blade 106 includes one or more internal structural shear webs 124 that span between the pressure shell member 110 and suction shell member 112 to form a structural support. In particular, the shear web 124 spans between spar caps 125 that are configured on internal surfaces of the shell members 110 and 112. The shear webs 124 and the spar caps 125 extend at least along a longitudinal length of the blade 106, and are typically, but not necessarily, configured as I-shaped members.

The spar cap provides support to the shear web and is a structural component of the wind turbine blade. Similarly, structural components are used to provide support to different engineering structures, e.g. subsea risers and gas turbine installations. The current invention relates to any structural component, with a wind turbine spar cap being an exemplary structural component.

Figure 4:
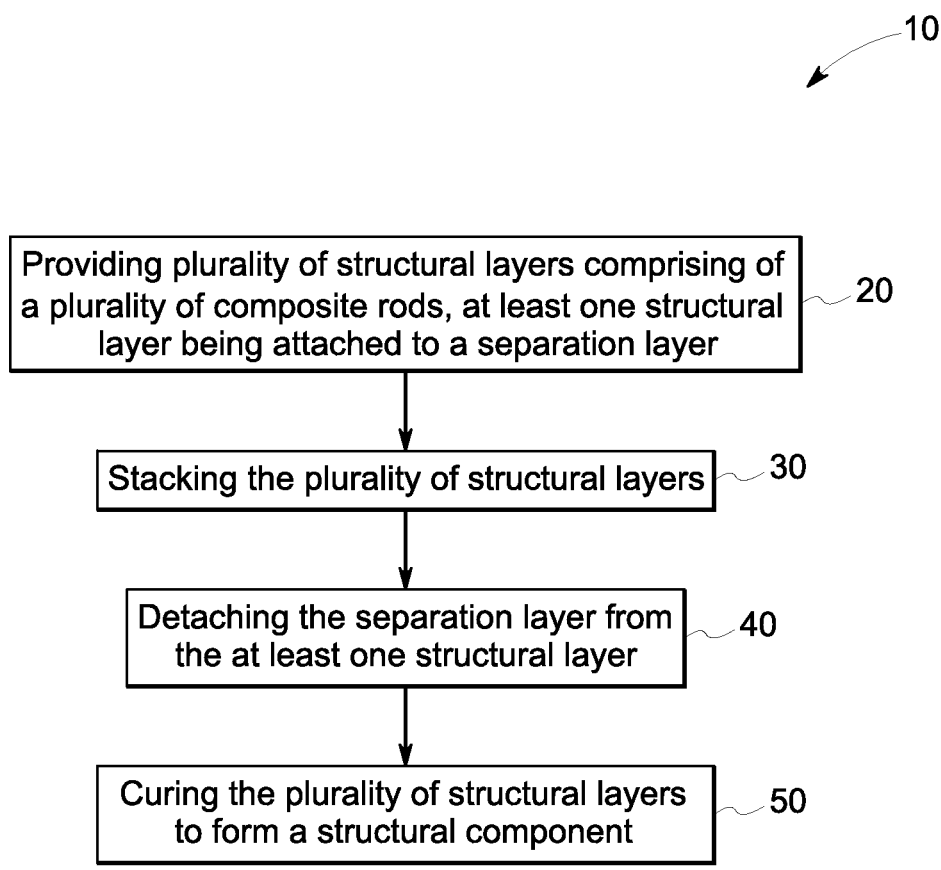
FIG. 4 is a flow chart representing steps involved in forming a structural component in accordance with one embodiment of the present invention.

FIG. 4 illustrates a flow chart representing an exemplary embodiment of a manufacturing method 10 for forming a structural component of a wind turbine blade according to an embodiment of the present invention. The manufacturing method 10 includes a step 20 of providing a plurality of structural layers with each structural layer comprising a plurality of composite rods. At least one structural layer from the plurality of structural layers is attached to a separation layer. The manufacturing method 10 further includes a step 30 of stacking the plurality of structural layers, a step 40 of detaching the separation layer from the at least one structural layer; and a step 50 of curing the plurality of structural layers to form a structural component of a wind turbine blade. The present invention is not limited to any specific order of steps. In one embodiment, step 30 occurs before step 40. In another embodiment, step 40 occurs prior to step 30. In still another embodiment, steps 30 and 40 occur simultaneously.

As used here, "providing" the structural layers means making the structural layers available and may take the form of fabricating the structural layers at the same manufacturing site as the structural component of the wind turbine blade or may take the form of procuring pre-assembled structural layers that are transported to the manufacturing site, for example.

The composite rods may comprise reinforcement fibers and a matrix material, for example. FIGS. 5 and 6 show perspective and cross-sectional views respectively of an exemplary composite rod 126 according to an embodiment of the present invention. In the embodiment of FIG. 5, the composite rod 126 has a longitudinal direction 130 and a cross sectional face 132. In one example shown in FIG. 6, the composite rod 126 may comprise a plurality of fibers 134 bonded by a matrix, 136. In a further specific embodiment of the invention, the plurality of fibers 134 in the composite rod 126 comprises carbon fibers, glass fibers, basalt fibers, boron fibers or combinations thereof. In another further specific embodiment of the invention, the matrix 136 comprises duroplastics (such as but not limited to epoxy resin, phenol resin, polyester resin, vinyl resin), thermoplastics (such as but not limited to polyether ether ketone (PEEK), polyphenylene sulfide (PPS) and polyetherimide (PEI), or combinations thereof.

In a specific embodiment of the invention, the composite rod has a cross sectional area ranging from about 5 square millimeters to about 500 square millimeters and a length ranging from about 10 meters to about 100 meters. In FIGS. 5 and 6, the composite rod 126 is shown as having a cross sectional face 132 in the shape of a rectangle. However, the cross section of the composite rod can be shaped in a multitude of ways, including, but not limited to, circles, rectangles with rounded corners, or other polygonal shapes. In a specific embodiment, the cross sectional face can be shaped as an octagon, as shown in FIG. 7. Although in embodiments shown in FIGS. 6 and 7 the fibers 134 are evenly spaced, the fibers 134 could be arranged and distributed differently within the composite rod.

The composite rods may be formed by any appropriate manufacturing method. In one example of an appropriate manufacturing method, the composite rods comprise pultruded profiles, which are formed by the process of pultrusion. Pultrusion is a manufacturing method for forming fiber reinforced composites with a constant cross-section. In this process, reinforcement fibers are soaked in a resin by pulling the fibers through a bath containing the resin. Subsequently, the resin infused fibers are pulled through a heated die. The resin on the fiber is cured by heating in the heated die as the resin infused fibers are pulled through the heated die and forms the matrix of the composite rods. The cross-section of the composite rods formed through this process is determined by the shape of the die.

Figure 8:
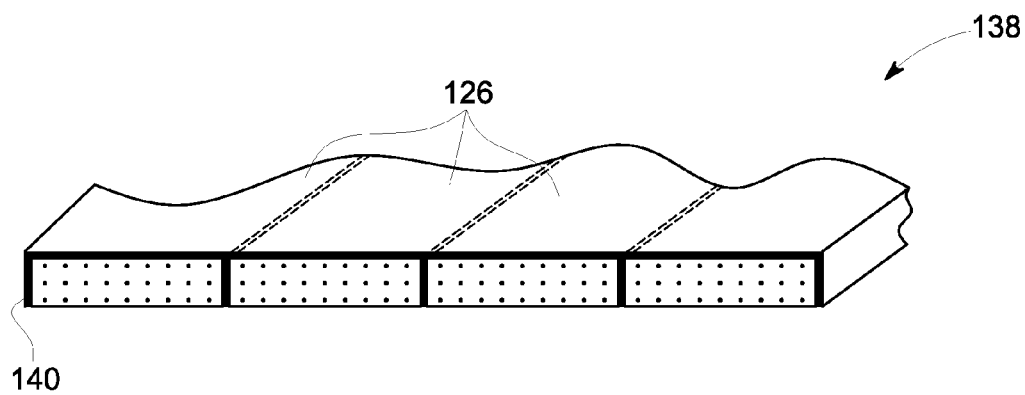
FIG. 8 is a perspective view of a structural layer in accordance with an embodiment of the present invention.

FIG. 8 shows an exemplary structural layer 138 comprising composite rods 126. In an exemplary embodiment of the invention, the composite rods 126 in a respective structural layer 138 are substantially parallel to each other. The term "substantially parallel" as used herein means an angular separation of less than about 2 degrees between adjacent composite rods. Although the example in FIG. 8 shows the composite rods 126 in the structural layer 138 in a single plane, some of the composite rods may be in a different plane, and thus the thickness of the structural layer 138 may be greater than the thickness of the composite rods. Additionally, although a planar structural layer is shown in FIG. 8, in specific embodiments of this invention, the structural layer may comprise a curved layer. In a further specific embodiment, the structural layer may comprise a doubly curved surface. A doubly curved surface can be defined as a surface which does not have any direction along the surface in which its curvature is essentially zero. Composite rods with octagonal cross sectional faces (as shown in FIG. 7) or hexagonal cross sectional faces (not shown) may provide better structural flexibility for curved structural layers, while maintaining a low risk of the composite rods sliding over each other.

In another exemplary embodiment of the invention, the composite rods 126 comprise at least partially wetted composite rods. In a further specific embodiment, the at least partially wetted composite rods comprise a wetting material 140 selected from a group consisting of epoxy resins, phenolic resins, polyester resins, vinylester resins, polyurethane, or a combination thereof. In a specific embodiment, the term 'partially wetted composite rods' may be defined as composite rods wherein at least 20% of the external surface area of the composite rods is in contact with the wetting material 140. In a more specific embodiment, the term 'partially wetted composite rods' may be defined as composite rods wherein at least 40% of the external surface area of the composite rods is in contact with the wetting material 140. In an exemplary embodiment of the invention, the composite rods 126 may be wetted by passing the composite rods through a bath comprising the wetting material 140. In another exemplary embodiment of the invention, the composite rods 126 may be wetted by pouring the wetting material 140 over the composite rods and subsequently pressing the wetting material into the gaps between the composite rods with a roller. In a further exemplary embodiment of the invention, the composite rods 126 may be wetted by spraying the wetting material 140 onto the composite rods 126.

Figure 9:
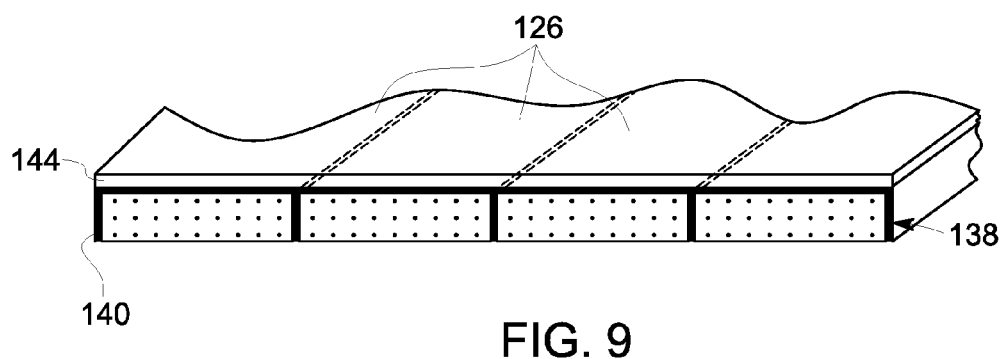
FIG. 9 is a perspective view of a separation layer attached to a structural layer in accordance with an embodiment of the present invention.

FIG. 9 shows an exemplary embodiment of a structural layer 138 attached to a separation layer 144. The separation layer 144 may comprise any material capable of being attached to and later removed from the structural layer 138. In an exemplary embodiment, the separation layer 144 may comprise paper, a polymeric material, or a combination thereof. The separation layer 144 may be attached in any appropriate manner, with examples including, but not limited to, use of an intermediate adhesive material, electrostatic forces, or any other physical or chemical forces, or a combination thereof. In a specific embodiment, the separation layer 144 may be made of a porous material, or have a mesh-like structure with holes in the separation layer material. The holes or pores in the separation layer may enable application of the separation layer on the structural layer without the formation of air pockets. Additionally, part of the wetting material may flow through these holes or pores in the separation layer, and aid in better attachment of the separation layer to the structural layer. Part of the wetting material flowing through the holes or pores in the separation layer may also aid attachment of multiple structural layers when they are stacked, which may be helpful during handling or transport of the stacked structural layers (if required). In one example, a thickness of the structural layer 138 ranges from about 0.2 mm to about 5 mm, and a thickness of the separation layer ranges from about 0.03 mm to about 0.2 mm.

Figure 10:
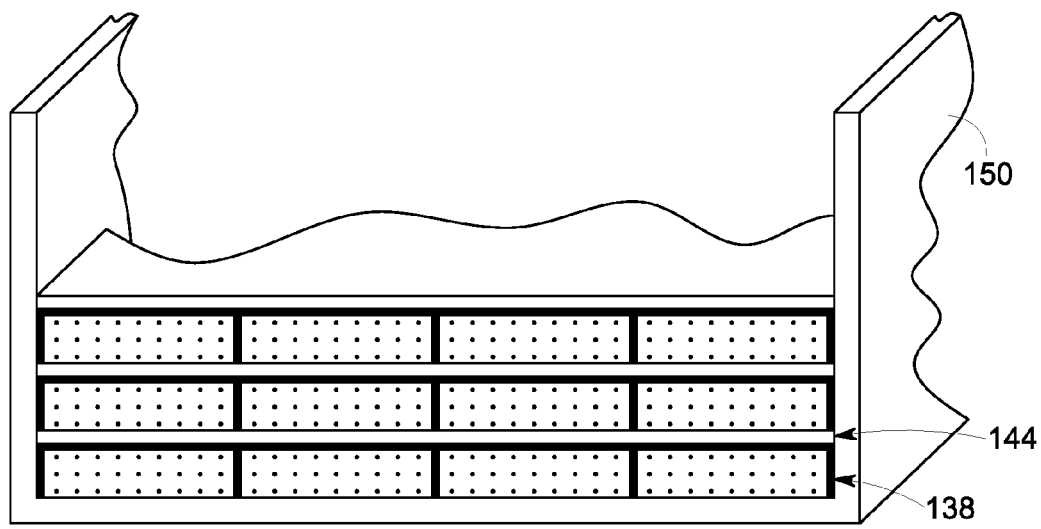
FIG. 10 is a perspective view of a plurality of structural layers and a plurality of separation layers stacked in a mold, in accordance with an embodiment of the present invention.

Referring back to FIG. 4, step 30 of the manufacturing method 10 includes stacking of the plurality of structural layers 138, and detaching the separation layer 144 from at least one structural layer 138. As discussed above, these steps may be done in various orders. FIG. 10 shows an exemplary embodiment of multiple structural layers 138 still attached to separation layers 144 and stacked over each other in a mold 150. FIG. 10 is thus an example of the scenario when step 30 is performed before step 40.

Figure 11:
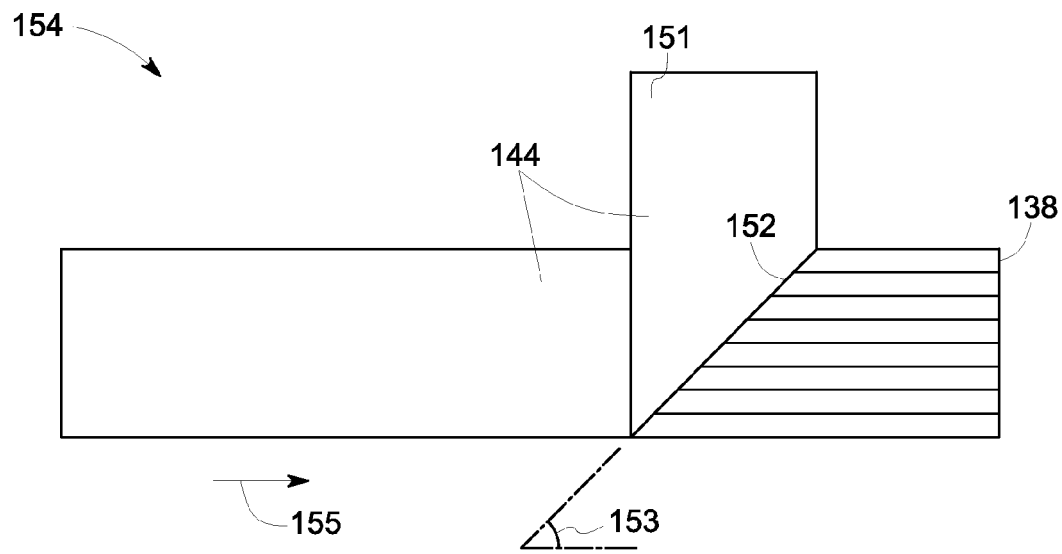
FIG. 11 is a schematic showing a method of detaching a separation layer from a structural layer in accordance with an embodiment of the present invention.

FIG. 11 shows a schematic 154 of an exemplary method of detaching a separation layer from a structural layer (step 40 of FIG. 4). The process of detaching includes removal of a separating layer 144 by pulling the separating layer away from the structural layer 138, by hand or an appropriate apparatus. The detachment of separation layer starts from a corner 151 of the separation layer, and is done in a manner such that a separation line 152 forms an angle 153 with a longitudinal direction 155 of the structural layer. Though the structural layer 138 and separation layer 144 are shown in a standalone configuration in FIG. 11 for ease of visualization, it may be understood that the same method of detachment of separation layer may be applicable when the structural layer 138 and separation layer 144 are part of a stack of a plurality of structural layers and separation layers (for example, as shown in FIG. 10). In a specific embodiment, wherein the separation layer is detached from the structural layer after stacking a plurality of structural layers (thus, the separation layer is detached from a structural layer which is a part of a stack of a plurality of structural and separation layers), the angle 153 may range from about 30 degrees to about 60 degrees. In a further specific embodiment, edges of structural layers above the separation layer 144 may be lifted temporarily to enable starting of detachment of separation layer 144 from the structural layer 138. Additionally, the ambient temperature may be adjusted to ease the detachment of the separation layer from the structural layer within the stack of structural layers. In another specific embodiment, wherein the separation layer is detached from the structural layer before stacking the structural layers (thus, separation layer is detached from the structural layer in a standalone configuration), the angle 153 may range from about 80 degrees to about 110 degrees.

Referring back to FIG. 4, step 50 of the manufacturing method 10 includes curing the plurality of structural layers to form a structural component of a wind turbine blade. In one specific embodiment, the plurality of structural layers may be exposed to temperatures in the range of from about 55 to about 120 degrees Celsius, for about 5 minutes to about 240 minutes.

An exemplary embodiment of the manufacturing method 10 further comprises infusing a resin (or, if the structural layer is already partially wetted, an additional resin) in the plurality of structural layers prior to curing the plurality of structural layers. The resin may comprise epoxy resins, phenolic resins, polyester resins, vinylester resins, polyurethane, or a combination thereof. During the process of curing (step 50), the resin hardens and enhances the structural integrity of the structural component. In a particular embodiment of the invention, the structural component of the wind turbine blade comprises a spar cap. As mentioned earlier, an example of a spar cap is shown as component 125 in FIG. 3.

Figure 12:
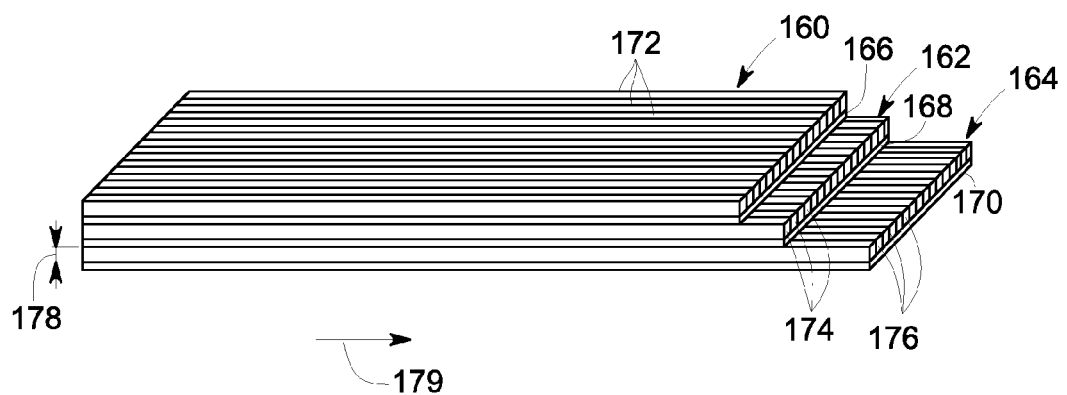
FIG. 12 is a perspective view of structural layers attached to separation layers in accordance with an embodiment of the present invention, wherein the composite rods in one structural layer are longer than the composite rods in at least one other structural layer.

In one embodiment, the composite rods in one structural layer are longer than the composite rods in at least some other structural layers. As an example, FIG. 12 shows three structural layers 160, 162, and 164, and three attached separation layers 166, 168 and 170. The structural layers 160, 162 and 164 each comprise a plurality of composite rods 172, 174 and 176 respectively. The composite rods 176 are longer than the composite rods 174, which are in turn longer than composite rods 172. In a more specific embodiment, the difference in length between the longer composite rods (for example 176) and the shorter composite rods (for example 174) is at least 10 times a thickness 178 of the structural layer 164. Though a specific order of decreasing length of composite rods is shown for purposes of this illustration, any one of the three pluralities of composite rods 172, 174 and 176 could be longer than the other two, without restriction of any particular order. Usage of different lengths of composite rods in different structural layers provides the ability of varying the stiffness and strength of the wind blade along a longitudinal direction 179 and also enables saving of raw material (i.e. composite rods).

Figure 13:
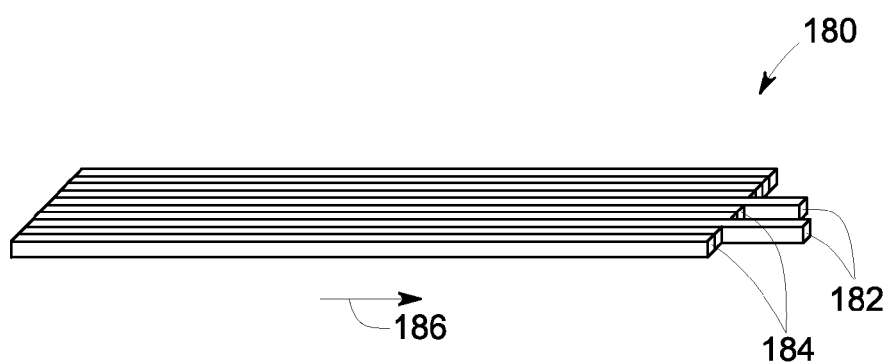
FIG. 13 is a perspective view of a structural layer in accordance with an embodiment of the present invention, wherein at least one composite rod in the structural layer is longer than at least some other composite rods in the structural layer.
Figure 14:
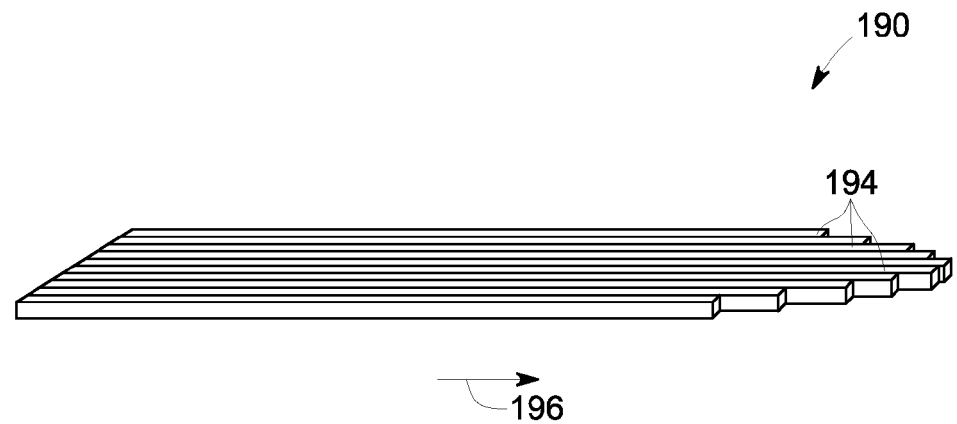
FIG. 14 is a perspective view of a structural layer in accordance with yet another embodiment of the present invention, wherein the lengths of the composite rods in the structural layer are varied in a way such the longest rods are near the center of the structural layer, and the shortest rods are near the edges.

FIG. 13 shows a perspective view of a structural layer 180 according to an embodiment of the present invention, wherein at least one composite rod 182 in a respective structural layer 180 is longer than at least some other composite rods 184 in the same structural layer 180. In a more specific embodiment, the composite rod 182 is longer than composite rod 184 by at least 2 percent of the length of composite rod 184. FIG. 14 shows a perspective view of a structural layer 190 according to another embodiment of this invention. In this embodiment, the lengths of the composite rods 194 are so arranged that the central composite rods are the longest and the composite rods near the edges are the shortest. In other words, the lengths of the composite rods 194 decrease as they move further away from the center of the structural layer. In another embodiment (not shown) of this invention, the lengths of the composite rods may be so arranged that the longest composite rod is on one side and the shortest composite rod is on the other side, with a continuous change in lengths of the composite rods from one side to the other.

Specific arrangements of composite rods in respective structural layers (as shown in FIGS. 13 and 14) provide the ability to control the stiffness of the structural layers 180 and 190, which in turn provides the ability to control the stiffness of a structural component manufactured using these structural layers along longitudinal directions 186 and 196.

Further, the lengths of composite rods (e.g. 182, 184 and 194) in structural layers with a variation in lengths of composite rods (e.g. 180 and 190) may be tuned to appropriate lengths with respect to lengths of composite rods in adjacent structural layers. This may enable accurate control of stiffness distribution in a longitudinal direction of the structural component, thus avoiding formation of stress concentrations.

From a manufacturing standpoint, a precise arrangement of varying lengths of composite rods in a single structural layer (as shown in FIGS. 13 and 14) is possible due to the fact that the separation layer helps in handling of the structural layer keeping the specific arrangement of composite rods intact until the layers are stacked in a mold. Additionally, specific shapes of the cross-sectional face of the composite rods (e.g. rectangular shape, as shown in the embodiment of FIG. 6) may provide significant stiffness along the stacking plane, ensuring that the rods don't shift during the handling of the structural layers as part of the manufacturing process.

In an embodiment, the invention is a method which includes providing a plurality of structural layers and a plurality of separation layers, wherein each structural layer among the plurality of structural layers comprises a plurality of at least partially wetted composite rods and is attached to a separation layer among the plurality of separation layers. The method further includes stacking the plurality of structural layers and the plurality of separation layers, followed by detaching the plurality of separation layers from the respective structural layers and subsequently curing the plurality of structural layers to form a structural component.

Several non-limiting examples of components for which the manufacturing methods described herein may be used include wind blade spar cap, sub-sea risers, support structures or other structural components for gas turbines, support structures for robots or other machines, reinforcements for bridges and stadiums, reinforcements for wind turbine blade leading edges (for example, component 114 of FIG. 2) or reinforcements for wind turbine blade trailing edges (for example, component 116 of FIG. 2).

Figure 15:
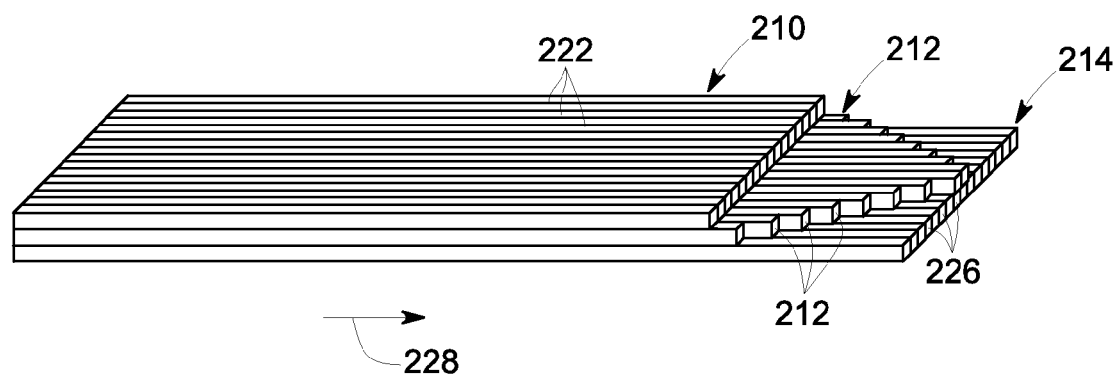
FIG. 15 is a perspective view of three structural layers in accordance with an embodiment of the present invention, wherein the composite rods in one layer have variable lengths.

The embodiments described herein may be used individually or in various combinations. For example, FIG. 15 illustrates a first structural layer 210 comprising of a first set of composite rods 222, a second structural layer 212 comprising of a second set of composite rods 224, and a third structural layer 214 comprising of a third set of composite rods 226, wherein the composite rods 226 are longer than the composite rods 222 and the lengths of the composite rods 224 are varied and are neither longer than the composite rods 226 nor shorter than the composite rods 222. In a more specific embodiment of the present invention, the lengths of the composite rods 224 are varied in such a way that the longest composite rods are near the center and the shortest composite rods are near the edges of the structural layer 212.

Usage of different lengths of composite rods in a particular structural layer provides the ability to accurately control the stiffness of the structural component (e.g. a wind blade spar cap) in which the structural layers are used along a longitudinal direction 228. Everything else being same, the stiffness of the spar cap at any particular point along its longitudinal direction increases with an increase in the number of structural layers across the cross-section at that particular point. Thus, changing the lengths of structural layers, and hence the lengths of composite rods in the structural layers, enables one to achieve a spar cap with varying stiffness along the longitudinal direction. The rate of change of stiffness along the longitudinal direction is dependent on the difference in lengths of composite rods from one structural layer to the adjacent structural layer. An intermediate structural layer (the second structural layer 212, in this example) with a variation in lengths of composite rods gives the ability to further control the rate of variation of stiffness of the spar cap along the longitudinal direction, thus avoiding formation of stress concentrations.

In a particular embodiment, each composite rod among the first, second and third sets of composite rods has a cross sectional area from about 5 square millimeters to about 500 square millimeters and lengths from about 10 meters to about 100 meters. In a further specific embodiment, the first and second sets of composite rods comprise pultruded profiles. The matrix bonding the plurality of composite rods can comprise epoxy resins, phenolic resins, polyester resins, vinylester resins, polyurethane, or a combination thereof.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
   (i) providing a plurality of structural layers and a plurality of separation layers, wherein each structural layer among the plurality of structural layers comprises a plurality of composite rods, and is attached to a respective_separation layer among the plurality of separation layers;
   (ii) stacking the plurality of structural layers and the plurality of separation layers such that at least one separation layer of the plurality of separation layers is placed between at least two structural layers of the plurality of structural layers;
   (iii) detaching the plurality of separation layers from the respective structural layers; and
   (iv) curing the plurality of structural layers to form a structural component of a wind turbine blade.

2. The method according to claim 1, wherein stacking occurs prior to detaching.

3. The method according to claim 2, wherein detaching the plurality of separation layers from the respective structural layers after stacking is carried out in a manner such that a separation line forms an angle with a longitudinal direction of the structural layer, wherein the angle varies from 30 degrees to 60 degrees.

4. The method according to claim 1, wherein the composite rods in a respective structural layer are substantially parallel to each other.

5. The method according to claim 1, wherein the composite rods have cross sectional areas from about 5 square millimeters to about 500 square millimeters and lengths from about 10 meters to about 100 meters.

6. The method according the claim 1, wherein the composite rods in one structural layer are longer than the composite rods in at least some other structural layer.

7. The method according to claim 1, wherein at least one composite rod in a respective structural layer is longer than at least some other composite rods in the respective structural layer.

8. The method according to claim 1, wherein the composite rods each comprise a plurality of fibers bonded by a matrix.

9. The method according to claim 8, wherein the plurality of fibers comprises carbon fibers, glass fibers, basalt fibers, boron fibers or combinations thereof, and the matrix comprises duroplastics, thermoplastics, or combinations thereof.

10. The method according to claim 1 wherein the composite rods comprise pultruded profiles.

11. The method according to claim 1 wherein the composite rods comprise at least partially wetted composite rods.

12. The method according to claim 11, wherein the at least partially wetted composite rods comprise a wetting material selected from a group consisting of epoxy resins, phenolic resins and polyurethanes.

13. The method according to claim 1, further comprising:
    infusing a resin in the plurality of structural layers prior to curing the plurality of structural layers.

14. The method according to claim 1, wherein the structural component of the wind turbine blade comprises a spar cap.

15. A method comprising:
   (i) providing a plurality of structural layers and a plurality of separation layers, wherein each structural layer among the plurality of structural layers comprises a plurality of composite rods and is attached to a respective separation layer among the plurality of separation layers;
   (ii) stacking the plurality of structural layers and the plurality of separation layers such that at least one separation layer of the plurality of separation layers is placed between at least two structural layers of the plurality of structural layers;
   (iii) detaching the plurality of separation layers from the respective structural layers, after stacking; and
   (iv) curing the plurality of structural layers to form a structural component.

16. The method according to claim 15, where the structural component comprises a subsea riser.

17. The method according to claim 15, wherein the structural component comprises a support structure for a gas turbine installation.

18. The method according to claim 15, wherein the composite rods comprise at least partially wetted composite rods.

* * * * *